US009866711B2

(12) United States Patent
Iwashima (10) Patent No.: US 9,866,711 B2
(45) Date of Patent: Jan. 9, 2018

(54) IMAGE FORMING APPARATUS UNDERGOING MAINTENANCE WORK

(71) Applicant: KYOCERA Document Solutions Inc., Osaka (JP)

(72) Inventor: Yasuhiro Iwashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/224,599

(22) Filed: Jul. 31, 2016

(65) Prior Publication Data

US 2017/0034369 A1 Feb. 2, 2017

(30) Foreign Application Priority Data

Jul. 31, 2015 (JP) .................................. 2015-151514

(51) Int. Cl.
*G06K 15/00* (2006.01)
*H04N 1/00* (2006.01)
*G06F 3/12* (2006.01)

(52) U.S. Cl.
CPC ....... *H04N 1/00344* (2013.01); *G06F 3/1205* (2013.01); *G06F 3/1238* (2013.01); *G06F 3/1257* (2013.01); *H04N 2201/0094* (2013.01)

(58) Field of Classification Search
None
See application file for complete search history.

(56) References Cited

U.S. PATENT DOCUMENTS

| 2003/0063305 A1* | 4/2003 | McIntyre | G06K 15/00 358/1.13 |
| 2003/0218642 A1* | 11/2003 | Sakayori | G09B 21/00 715/853 |
| 2006/0099947 A1* | 5/2006 | Shozaki | H04L 61/1523 455/435.1 |
| 2007/0283253 A1* | 12/2007 | Asakimori | H04N 1/0097 713/182 |

(Continued)

FOREIGN PATENT DOCUMENTS

| JP | 2004-192625 A | 7/2004 |
| JP | 2007-003900 A | 1/2007 |
| JP | 2009-248492 A | 10/2009 |

*Primary Examiner* — Helen Q Zong
(74) *Attorney, Agent, or Firm* — Hawaii Patent Services; Nathaniel K. Fedde; Kenton N. Fedde (57) ABSTRACT

Provided is an image forming apparatus that prevents the image forming apparatus being operated in a state where a user setting value is changed by a maintenance worker before a user is aware of the change without lowering efficiency of a maintenance work. The image forming apparatus according to the present disclosure is an image forming apparatus whose operation is controlled based on a setting value, and the setting value contains an operation control user setting value set by an administrator user having administrator authority. The image forming apparatus includes a maintenance work processing part that prohibits a general user having no administrator authority from using the image forming apparatus until the administrator user approves the operation control user setting value changed by the maintenance worker if the operation control user setting value is changed by the maintenance worker having the administrator authority.

6 Claims, 7 Drawing Sheets

(56) References Cited

U.S. PATENT DOCUMENTS

2011/0188073 A1* 8/2011 Akutsu ................... G06F 15/00
  358/1.15
2013/0201510 A1* 8/2013 Miyata ............... G03G 15/5004
  358/1.13

* cited by examiner

⚠ OPERATION CONTROL USER SETTING VALUE IS CHANGED
BY MAINTENACE WORK
DO YOU APPROVE CHANGE ?

| DETAILS OF CHANGE | BEFORE MAINTENANCE | AFTER MAINTENANCE |
|---|---|---|
| USB HOST LOCK | ENABLE | DISABLE |

APPROVE — B101

REJECT — B102

FIG.7

IMAGE FORMING APPARATUS UNDERGOING MAINTENANCE WORK

INCORPORATION BY REFERENCE

This application is based on and claims the benefit of priority from Japanese Patent Application No. 2015-151514 filed on Jul. 31, 2015, the entire contents of that are hereby incorporated by reference.

BACKGROUND

The present disclosure relates to an image forming apparatus that undergoes a maintenance work by a maintenance worker.

In certain instances, the image forming apparatus might need to perform a maintenance work for maintaining service quality. In the maintenance work, the image forming apparatus is designed to be able to output maintenance information from the image forming apparatus, update firmware of the image forming apparatus, and change various setting values in the image forming apparatus. Further, in the maintenance work, the image forming apparatus is designed to be able to output maintenance information from the image forming apparatus. Confidential information of a user is sometimes stored in the image forming apparatus, and thus it needs to take measures against leakage of the confidential information in performing a maintenance work. Therefore, there has been proposed so far a technology allowing only an authenticated maintenance worker to perform a maintenance work, an external terminal carried by the maintenance worker to specify as an output destination of the maintenance information, thereby preventing the maintenance information from being printed.

Some of the various setting values of the image forming apparatus can be set by a user, and activate the image forming apparatus based on the user setting value. For example, the image forming apparatus can be operated by adjusting the user setting value so as to set a user accessible to the confidential information, and by creating a security environment so as not to leak the confidential information. When the user setting value is changed, an operation of the image forming apparatus is changed accordingly. Thus, there has been proposed so far a technology protecting a setting value from being changed by other users.

SUMMARY

According to one aspect of the present disclosure, the present disclosure provides an image forming apparatus whose operation is controlled based on a setting value, wherein the setting value contains an operation control user setting value set by an administrator user having administrator authority; and wherein further comprises a maintenance work processing part that prevents a general user having no administrator authority from using the image forming apparatus until the administrator user approves the operation control user setting value changed by a maintenance worker.

DETAILED DESCRIPTION

Hereinafter, a detailed description will be given to an embodiment of the present disclosure with reference to the accompanying drawings. In the following embodiment, a configuration having the same function is denoted by the same reference numeral.

Figure 1:
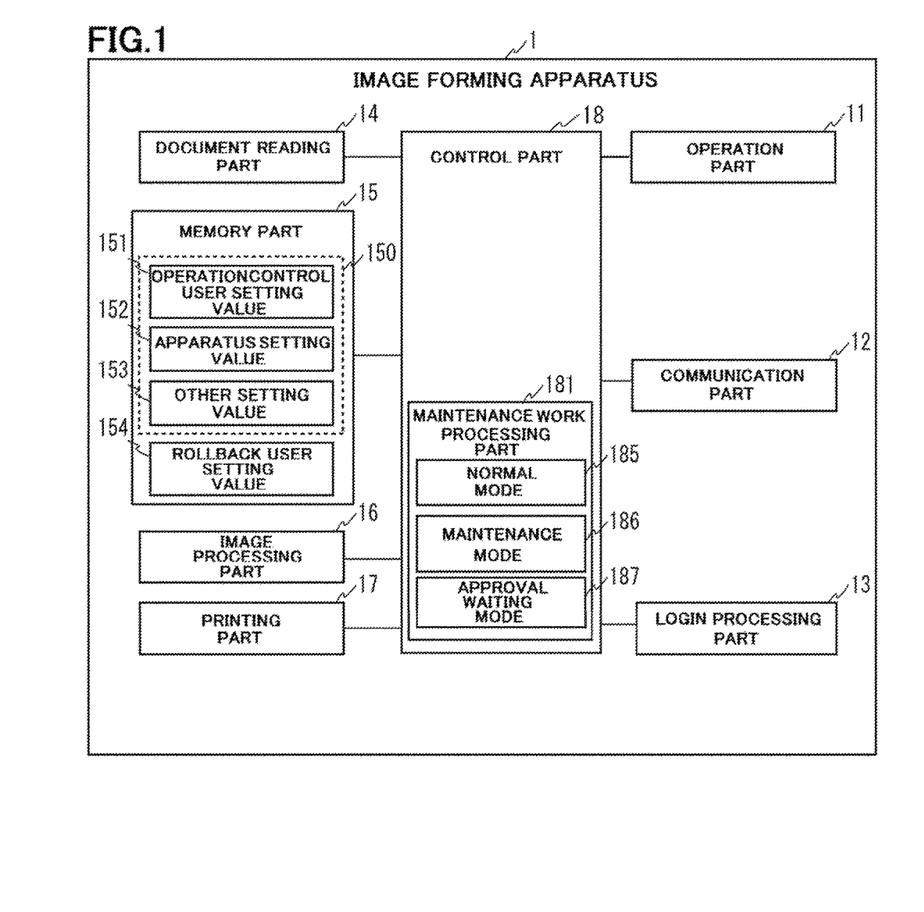
FIG. 1 is a functional block diagram showing a configuration of an image forming apparatus according to an embodiment of the present disclosure.

An image forming apparatus 1 shown in FIG. 1 is a MFP (Multifunction Peripheral) including a copy function, a scanner function and a network communication function, or the like. The image forming apparatus 1 includes an operation part 11, a communication part 12, a login processing part 13, a document reading part 14, a memory part 15, an image processing part 16, a printing part 17 and a control part 18.

The operation part 11 is a user interface including various operation keys such as a touch panel that functions as display means and input means in which a transparent pressure sensor is provided on a front surface of a liquid crystal display panel, a ten key that inputs a numerical value such as the number of printing sheets, a reset key that inputs an instruction to initialize setting information, a stop key that stops a copying operation and clears an input numerical value, an interrupt key that instructs an interrupt copying, and a start button that inputs an output instruction to start a printing operation.

The communication part 12 has a function of transmitting and receiving various data between external terminals via a network such as a LAN (Local Area Network).

The document reading part 14 is a scanner that irradiates light on a document fed by a document feeding device (not shown) and on a document mounted by a user on a platen glass, and receives reflected light from the documents to read a document image.

The memory part 15 is memory means, such as a semiconductor memory and a HDD (Hard Disk Drive), which accumulates document data read by the document reading part 14 and document data received by the communication part 12. Note that the document data of the present embodiment is a generic term of document information composed of image data, text data, graphic data, or a combination thereof.

Further, a setting value 150 and a rollback user setting value 154 are stored in the memory part 15. The image forming apparatus 1 is controlled based on the setting value 150. The setting value 150 contains an operation control user setting value 151, an apparatus setting value 152, and other setting value 153.

The operation control user setting value 151 is a setting value set by an administrator user. When the administrator user sets access authority to a user accessible to confidential information and sets a setting of enabling and disabling a USB connection to the image forming apparatus 1, the setting value is set as the operation control user setting value 151. The administrator user can create a security environment of the image forming apparatus 1 by the operation control user setting value 151.

The apparatus setting value 152 is a setting value about an apparatus operation. For example, the operation control value 152 contains a correction value of a printing position of the printing part 17 and a correction value of a reading position of the document reading part 14.

The other setting value 153 is a setting value about ones other than the operation control user setting value 151 and apparatus setting value 152. Apart from that, the setting value 154 contains a setting value of time.

The rollback user setting value 154 is an operation control user setting value 151 copied immediately before a maintenance work. When the image forming apparatus 1 transits to a maintenance mode 186 for a maintenance work, the operation control user setting value 151 is backed up and temporally stored in the memory part 15 as the rollback user setting value 154.

Figure 2:
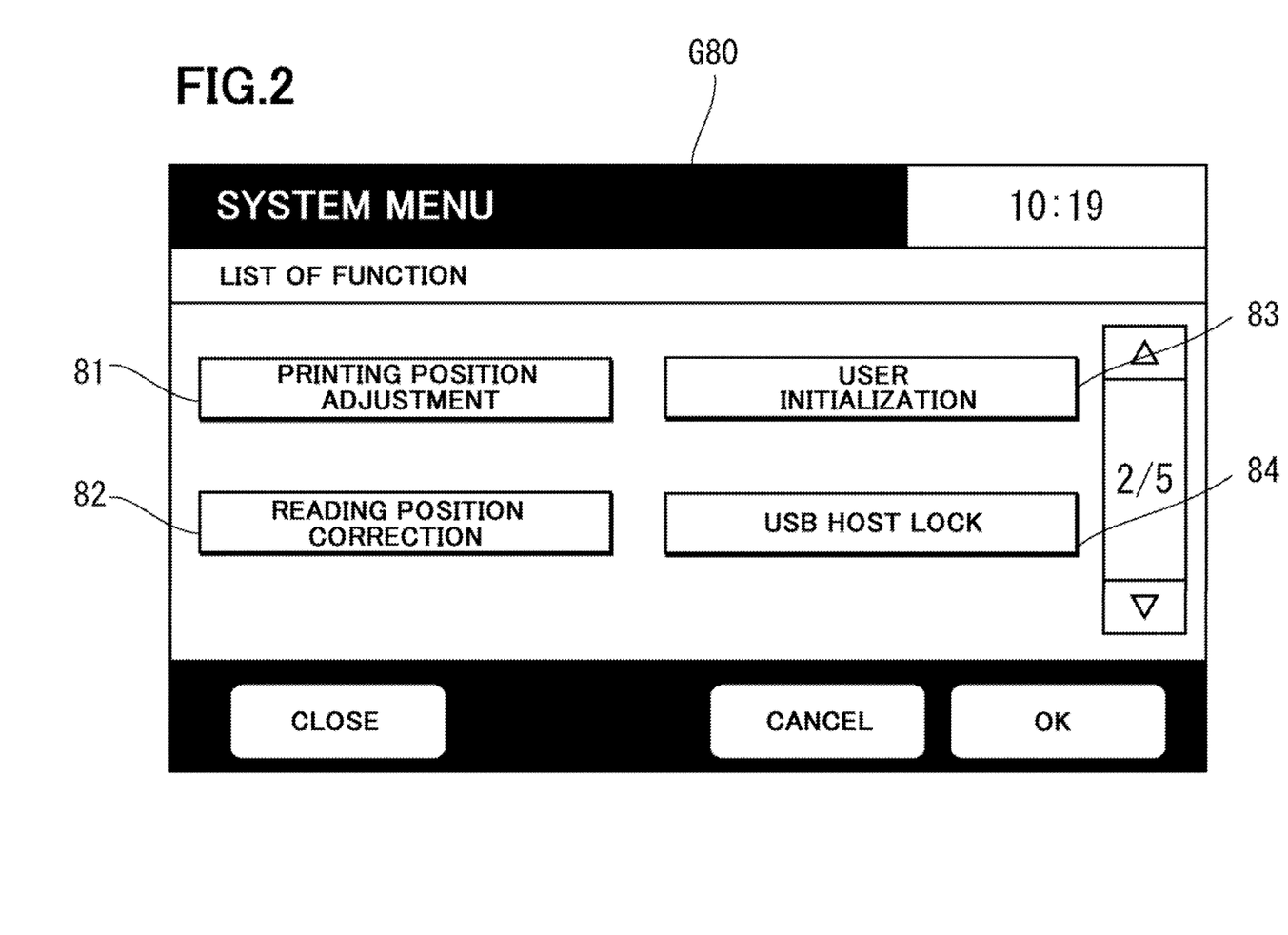
FIG. 2 is one example of a maintenance menu screen.

FIG. 2 is one example of a system menu screen G80 that can be displayed by an administrator user. In the system menu screen G80, a printing position adjustment 81, a reading position correction 82, a user initialization 83 and a USB HOST LOCK 84 can be set. The printing position adjustment 81 can adjust a printing position of the printing part 17. The reading position correction 82 can adjust a document reading position of the document reading part 14. When a setting is made in the printing position adjustment 81 and the reading position adjustment 82, they are stored as the apparatus setting value 152. Further, the user initialization 83 can initialize the image forming apparatus 1 to a state of factory shipping. The USB HOST LOCK 84 can set whether a USB connection to the image forming apparatus 1 is enabled or disabled. When a setting is made in the printing position adjustment 81 and the reading position adjustment 82, the apparatus setting value 152 is changed depending on the settings. When a setting is made in the user initialization 83 and the USB HOST LOCK 84, the operation control user setting value 151 is changed depending on the settings.

Figure 3:
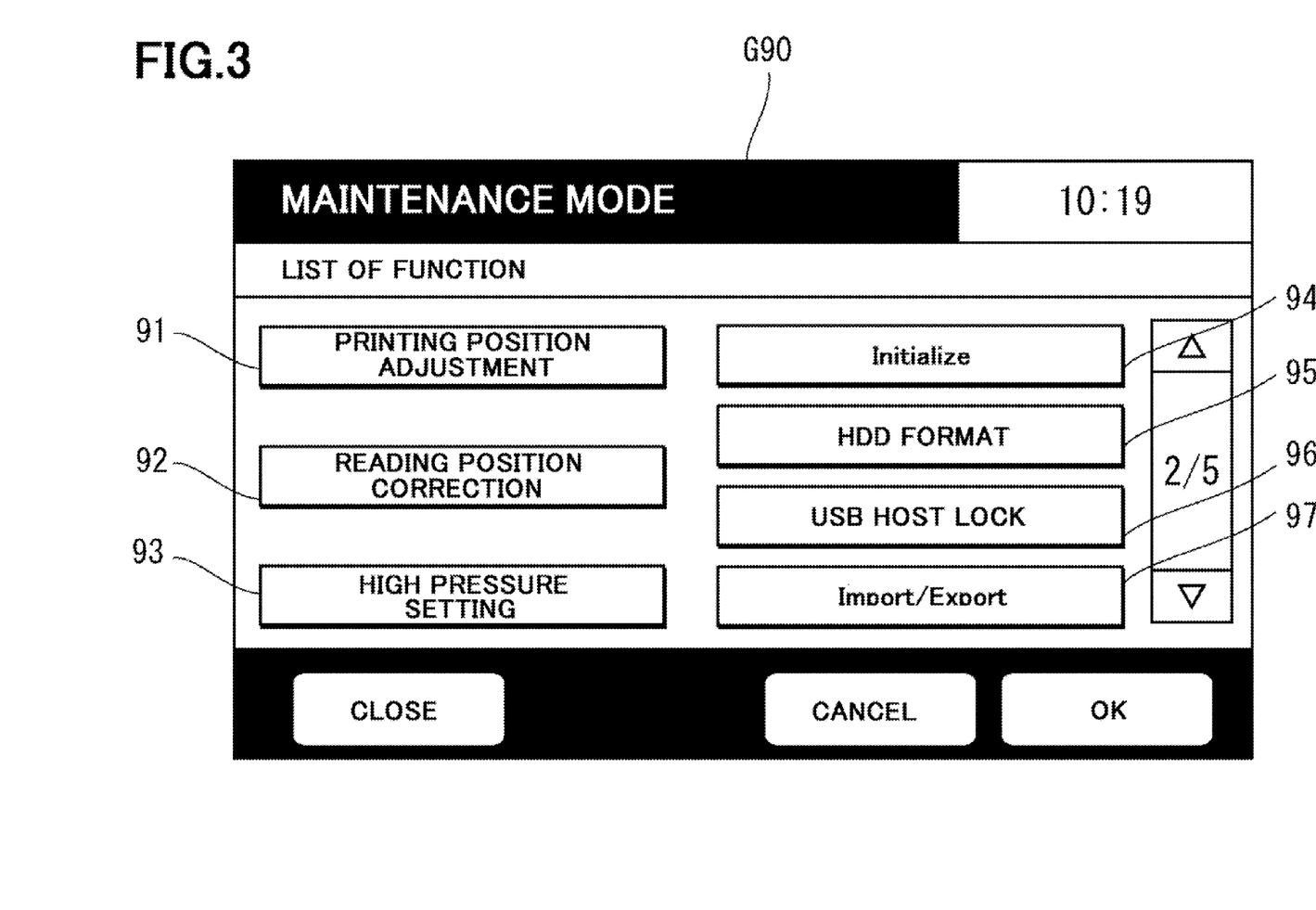
FIG. 3 is one example of a maintenance mode screen.

FIG. 3 is one example of a maintenance mode screen G90 that a maintenance worker can be displayed. The maintenance mode screen G90 can set the printing position adjustment 91, the reading position correction 92, a high pressure setting 93, an Initialized 94, a HDD FORMAT 95, the USB HOST LOCK 96, an Import/Export 97, or the like. The printing position adjustment 91 corresponds to the printing position adjustment 81 and the reading position correction 92 corresponds to the reading position correction 82. The high pressure setting 93 can set the density of printing by setting a bias voltage of the image forming apparatus 1. The Initialized 94 corresponds to the user initialization 83 and the USB HOST LOCK 96 corresponds to the USB HOST LOCK 84. Further, the HDD FORMAT 95 can initialize the memory part 15. The Import/Export 97 can output the setting value 150 to an external memory and use as the setting value 150 by acquiring the setting value 150 from the external memory. When a setting is made in the printing position adjustment 91, the reading position adjustment 93 and the high pressure setting 93, the apparatus setting value 152 is changed depending on the settings. When a setting is made in the Initialized 94, the HDD FORMAT 95, the USB HOST LOCK 96 and the Import/Export 97, the operation control user setting value 151 is changed depending on the settings.

The image processing part 16 is means for applying specific image processing to the document data. The image processing part 16 performs, for example, image improvement processing such as scaling processing, density adjustment and gradation adjustment.

The printing part 17 is printing means for printing the document data stored in the memory part 15 as a document image. The printing part 17 forms, for example, a latent image on a photosensitive drum based on the document data read out from the memory part 15, performs image formation by a toner with the latent image as a toner image, transfers the toner image from the photosensitive drum to a recording paper, fixes the toner image on the recording paper and discharges the recording paper.

The login processing part 13 performs login authentication of a user referring to user information (not shown) and imposes a limitation on a function available in the image forming apparatus 1 depending on authority granted to a user who succeeded in authentication to encourage the user to log in. For example, when an administrator user having administrator authority is logged in, the login processing part 13 enables the system mode screen G80 to be displayed. In the meantime, when a maintenance worker having maintenance work authority is logged in, the login processing part 13 enables the maintenance mode screen G90 to be displayed. A general user having no administrator authority nor maintenance authority cannot display the system menu screen G80 and the maintenance mode screen G90 even if the user is logged in. In this connection, the user information may also be stored in the memory part 15 as the operation control user setting value 151.

The control part 18 is connected respectively to the operation part 11, the communication part 12, the login processing part 13, the document reading part 14, the memory part 15, the image processing part 16 and the printing part 16, and performs the whole operation control of the image forming apparatus 1 in response to specific instruction information input from the operation part 11. The control part 18 is an information processing part such as a microcomputer including ROM (Read Only Memory) and a RAM (Random Access Memory), or the like. A control program for performing operation control of the image forming apparatus 1 is stored in the ROM. The control part 18 reads the control program stored in the ROM, and controls the whole apparatus in response to the specific instruction information input from the operation part 11 by developing the control program on the RAM.

Further, the control part 18 functions as a maintenance work processing part 181 that determines whether or not the operation control user setting value 151 is changed by a maintenance work of a maintenance worker. If the operation control user setting value 151 is not changed, the maintenance work processing part 181 makes the image forming apparatus 1 available to a general user after a maintenance work. Otherwise, if the operation control user setting value 151 is changed, the maintenance work processing part 181 makes the image forming apparatus 1 unavailable to the general user after the maintenance work until an administrator user approves the change of the operation control user setting value 151.

Specifically, the maintenance work processing part 181 has a normal mode 185 during which the image forming apparatus 1 is available to a general user, a maintenance mode 186 during which a maintenance worker can perform a maintenance work and an approval waiting mode 187 during which the operation control user setting value 151 changed by the maintenance work is waiting for approval by an administrator user. The maintenance work processing part 181 controls the image forming apparatus 1 under one of the normal mode 186, the maintenance mode 186 and the approval waiting mode 187.

Figure 4:
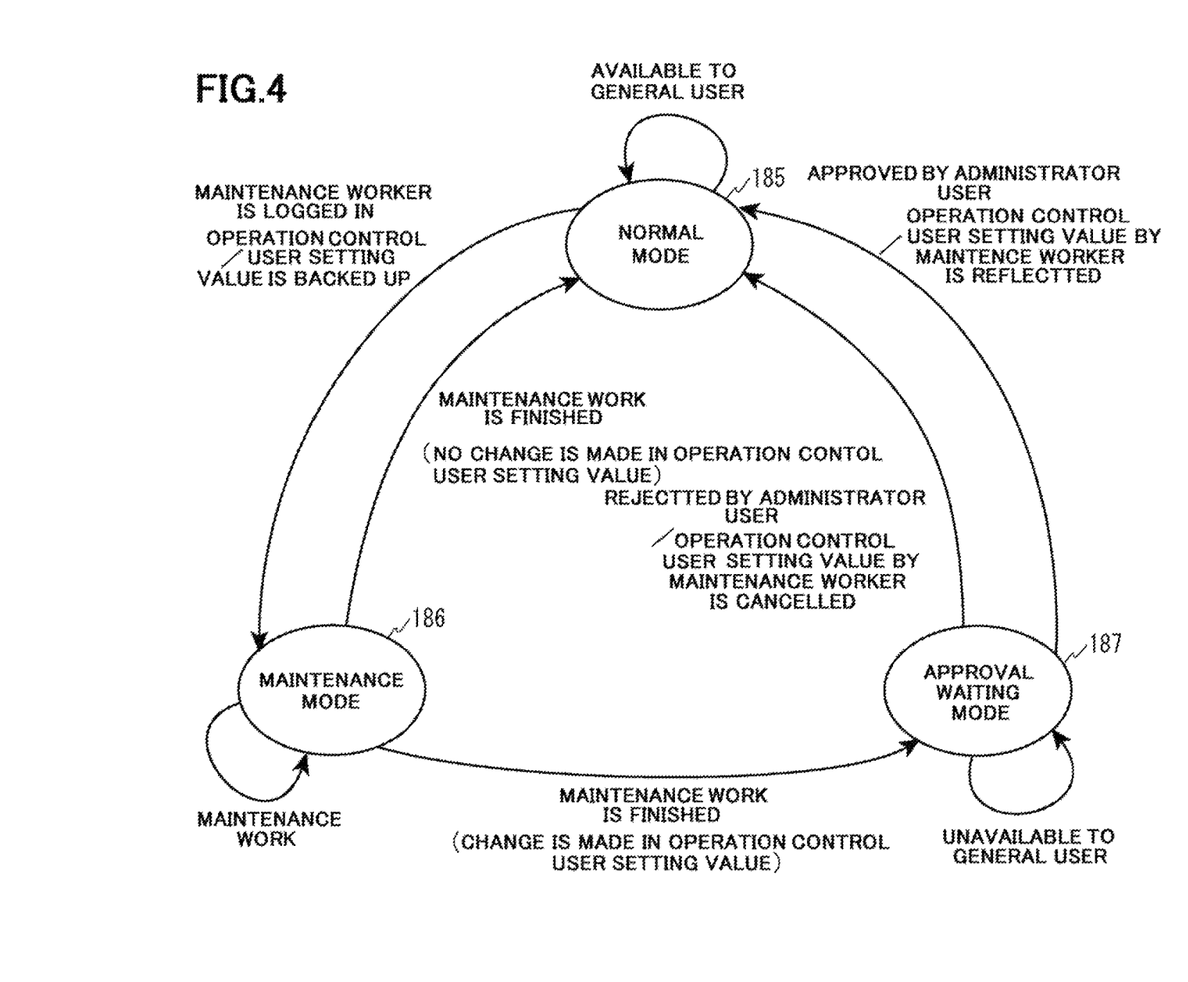
FIG. 4 is a state transition diagram among a normal maintenance mode, a maintenance mode and an approval waiting mode shown in FIG. 1.

FIG. 4 is a state transition diagram among the normal mode 185, the maintenance mode 186 and the approval waiting mode 187.

In the normal mode 185, the image forming apparatus 1 is available to a general user and is controlled based on the setting value 150. If a maintenance worker is logged in using a maintenance work password when the maintenance work processing part 181 is in the normal mode 185, the image forming apparatus 1 transits to the maintenance mode 186. At the time when the image forming apparatus 1 transits to the maintenance mode 186, the operation control user setting value 151 is backed up and temporally stored in the memory part 15 as the rollback user setting value 154.

In the maintenance mode 186, a maintenance worker can perform a maintenance work to the image forming apparatus 1. According to the details of the maintenance work, the operation control user setting value 151, the apparatus setting value 152 and other setting value 153 are respectively changed. When the maintenance work is finished, the maintenance work processing part 181 compares the backed up rollback user setting value 154 with the operation control user setting value 151, and determines whether or not the operation control user setting value 151 is changed. If no change is made in the operation control user setting value 151, for example, if only the apparatus setting value 152 and the other setting value 153 are changed by a maintenance work, the image forming apparatus 1 returns back to the normal mode 185. Otherwise, if the maintenance work is finished and a change is made in the operation control user setting value 151, the image forming apparatus 1 transits to the approval waiting mode 187.

In the approval waiting mode 187, it makes the image forming apparatus 1 unavailable to a general user. This is because the operation control user setting value 151 is changed by the maintenance work and a security level of the image forming apparatus 1 is dropped. Even though the general user tries to use the image forming apparatus 1 when the image forming apparatus 1 is in the approval waiting mode, a message to prompt to approve by an administrator user is displayed on the operation part 11, and a work is precluded from performing using the image forming apparatus 1. If the administrator user logged in the image forming apparatus 1 when the image forming apparatus 1 is in the approval waiting mode 187, the operation control user setting value 151 is changed by a maintenance work and the details of the change of the operation control user setting value 151 are displayed, and comes to a state where it is able to instruct whether the change of the operation control user setting value 151 is approved or rejected. If the administrator user approves the change, the change of the operation control user setting value 151 by the maintenance worker is reflected (fixed) in the memory part 15, and the image forming apparatus 1 proceeds to the normal mode 185. Otherwise, if the administrator user rejects the change, the operation control user setting value 151 is overwritten with the rollback user setting value 154, and the operation control user setting value 151 is rolled back to a state of the operation control user setting value 151 immediately before a maintenance work. That is, the change of the operation control user setting value 151 by a maintenance worker is cancelled, and the image forming apparatus 1 proceeds to the normal mode 185.

Figure 5:
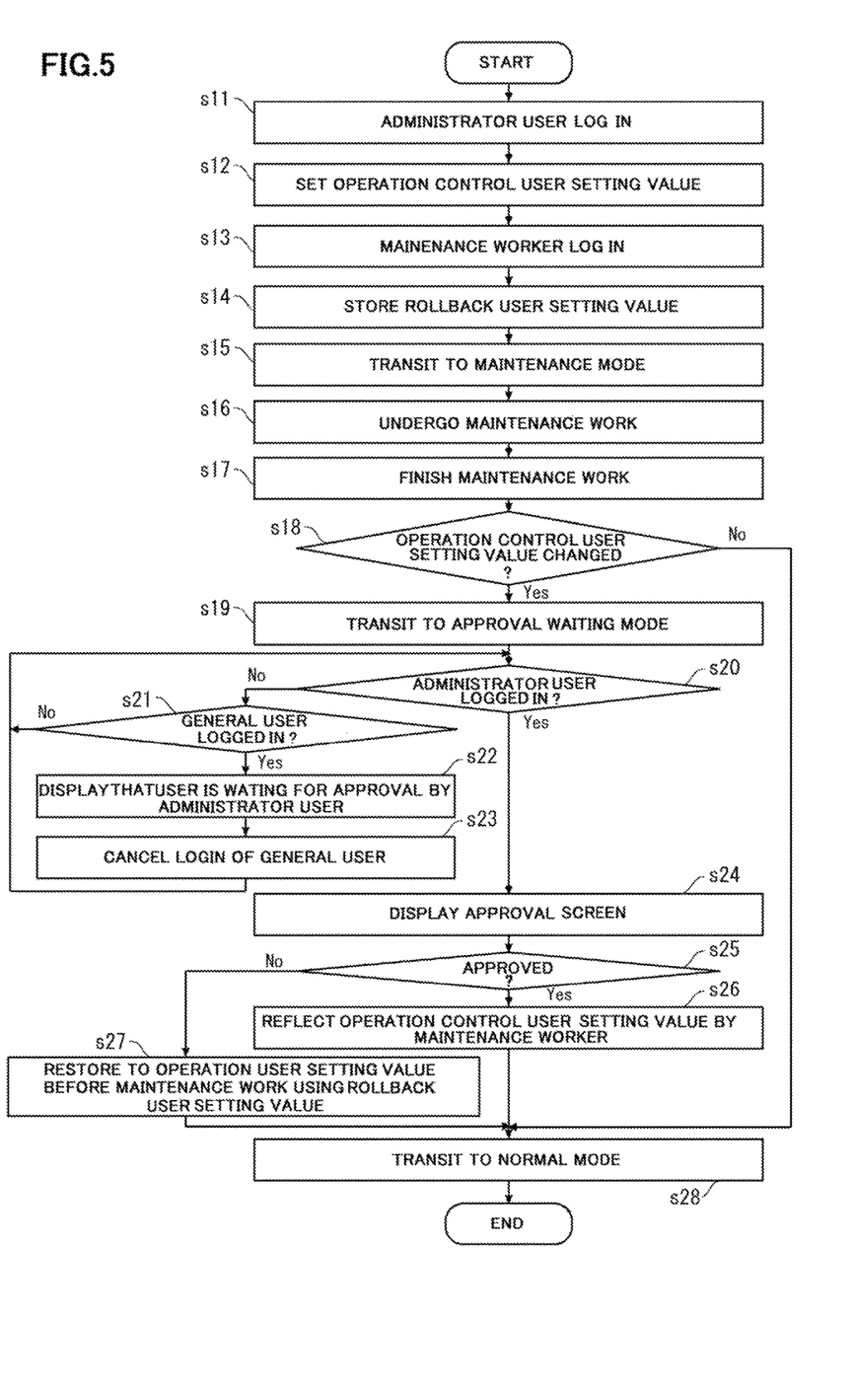
FIG. 5 is a flowchart showing a flow of processing of an image forming apparatus shown in FIG. 1.

FIG. 5 is a flowchart showing a flow of processing of the image forming apparatus 1.

First, an administrator user is logged in the image forming apparatus 1 through the login processing part 13 (step S11), and sets the operation control user setting value 151 so as to be a desired security environment (step S12).

Then, if the administrator user is logged in the image forming apparatus 1 through the login processing part 13 (step S13), the maintenance work processing part 181 backs up and stores the operation control user setting value 151 in the memory part 15 as the rollback user setting value 154 (step S14), and causes the image forming apparatus 1 to proceed to the maintenance mode 186 (step S15).

The maintenance work processing part 181 undergoes a maintenance work by a maintenance worker in the maintenance mode 186 (step S16). For example, if the maintenance worker is logged out and finishes the maintenance work (step S17), the image forming apparatus 1 compares the backed up rollback user setting value 154 with the operation control user setting value 151, and determines whether or not the operation control user setting value 151 is changed (step S18).

If no change is made in the operation control user setting value 151 (step S18:No), the maintenance work processing part 181 causes the image forming apparatus 1 to proceed to the normal mode 185 (step S28), and finishes the processing.

Otherwise, if a change is made in the operation control user setting value 151 (step S18:Yes), the maintenance work processing part 181 causes the image forming apparatus 1 to proceed to the approval waiting mode 187 (step S19), and determines whether or not an administrator user is logged in (step S20).

If the administrator user is not logged in (step S20:No), the maintenance work processing part 181 determines whether or not a general user is logged in (step S21). If the general user is also not logged in (step S21:No), the processing returns back to step S20. Otherwise, if the general user is logged in (step S21:Yes), the maintenance work processing part 181 displays on the operation part 11 to the effect that the general user is waiting for approval by the administrator user (step S22), cancels a login of the general user through the login processing part 13 (step S23), and the process returns back to the step S20. Therefore, the general user cannot use the image forming apparatus 1 when the image forming apparatus 1 is in the approval waiting mode 187. This is because the administrator user is not yet confirmed whether or not a security level of the image forming apparatus 1 is dropped due to the operation control user setting value 151 changed by a maintenance worker.

Otherwise, if the administrator worker is logged in (step S20:Yes), the maintenance work processing part 181 displays an approval screen on the operation part 11 (step S24).

Figure 6:
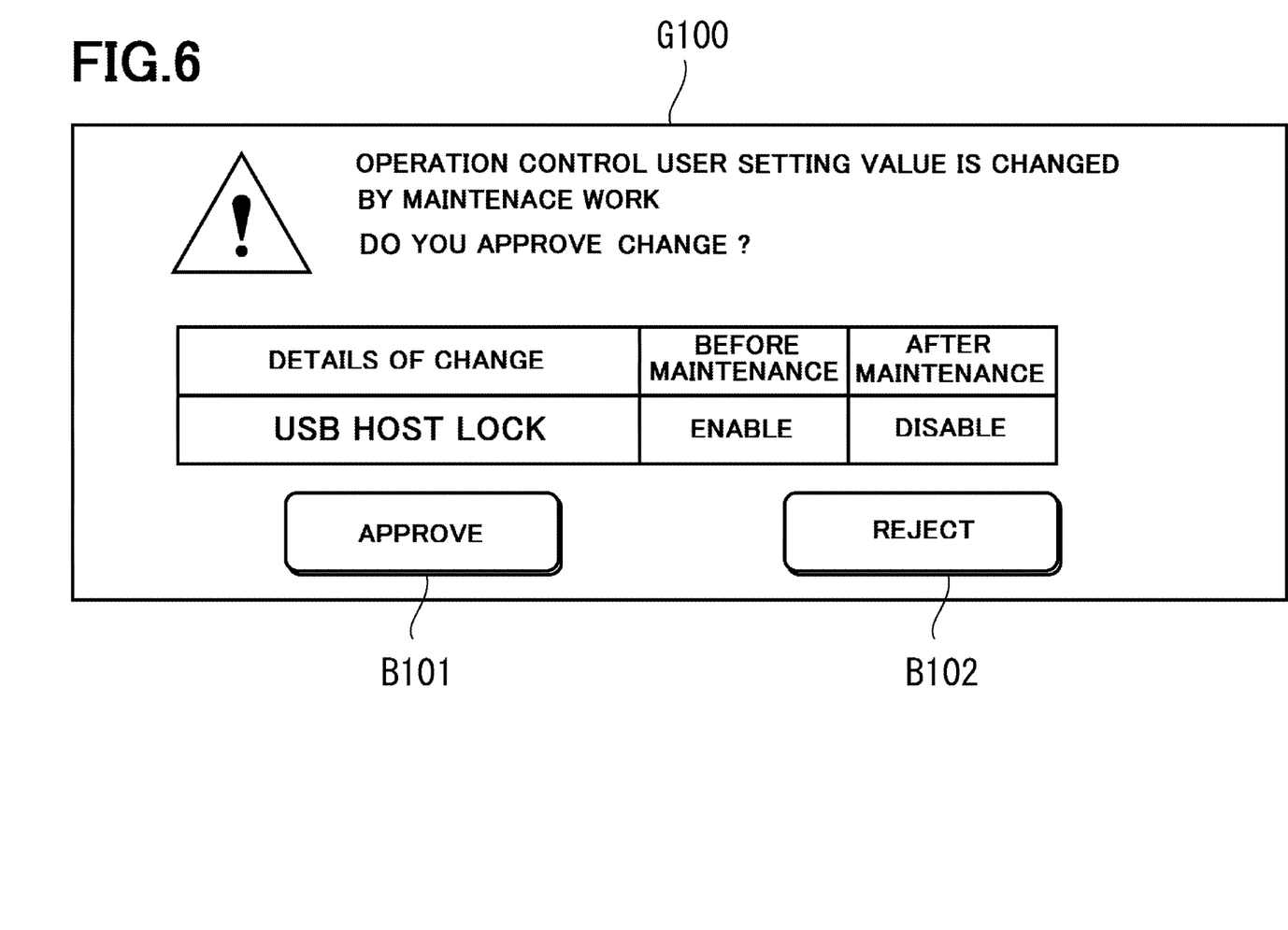
FIG. 6 is one example of an approval screen.

FIG. 6 is one example of an approval screen G100. The approval screen G100 displays to the effect that the operation control user setting value 151 is changed, the details of the change of the operation control user setting value 151 changed by a maintenance work, and a setting value before and after a maintenance work. Further, the approval screen G100 is provided with an approval button B101 and a reject button B102. The administrator user, who confirms the details of the change, can instruct to approve the change by pressing the approval button B101, or can instruct to reject the change by pressing the reject button B102.

If the change is approved (step S25:Yes), the maintenance operation processing part 181 reflects (fixes) the change of the operation control user setting value 151 changed by a maintenance worker (step S26), causes the image forming apparatus 1 to proceed to the normal mode (step S28), and finishes the processing.

Otherwise, if the approval is not instructed (step S25:No), that is, if the rejection is instructed, the maintenance work processing part 181 rolls back the operation control user setting value 151 to a state before a maintenance work by using the roll back user setting value 154 (step S27). Namely, the operation control user setting value 151 changed by a maintenance worker is cancelled, and the rollback user setting value 154 is reflected in the setting value 150 as the operation control user setting value 151. Subsequently, the maintenance work processing part 181 causes the image forming apparatus 1 to proceed to the normal mode 185 (step S28), and finishes the processing.

Thus, the image forming apparatus 1 includes a maintenance work processing part 181 whose operation is controlled based on the setting value 150. The setting value 150 contains the operation control user setting value 151 set by an administrator user having administrator authority. If the operation control setting value 151 is changed by a maintenance worker having maintenance work authority, the maintenance work processing part 181 prohibits a general user from using the image forming apparatus 1 until the operation control user setting value changed by the maintenance worker is approved. Therefore, this prevents the image forming apparatus 1 from being used by the general user in a state where a security level is dropped caused by the change of the operation control user setting value 151 by the maintenance work before the administrator user is aware of the change. Further, the maintenance worker is allowed to change all the setting values 150 in the maintenance mode 186, and thus eliminates the presence and permission by a user during the maintenance work. Furthermore, the maintenance work can be continued without considering an impact on the operation control user setting value 151, and thus does not decrease maintenance work efficiency.

Moreover, the maintenance operation processing part 181 backs up the operation control user setting value 151 immediately before a change by a maintenance worker in the memory part 15 as the rollback user setting value 154. If an administrator user rejects the change, the maintenance operation processing part 181 cancels the operation control user setting value 151 changed by the maintenance worker, and reflects the rollback user setting value 154 as the operation control user setting value 151. Therefore, if the administrator user determines that a security level of the image forming apparatus 1 drops using the operation control user setting value 151 changed by the maintenance worker, the administrator user can restore the operation control user setting value 151 to the rollback user setting value 154 immediately before a maintenance work.

Further, if an administrator user approves the change, the maintenance work processing part 181 reflects the operation control user setting value 151 changed by the maintenance worker in the setting value 150. Therefore, this enables the user setting value changed by the maintenance worker not to be reflected in the setting value 150 until the administrator user approves the user setting value.

Furthermore, if only the setting values (152,153) other than the operation control user setting value 151 are changed by the maintenance worker, the maintenance operation processing part 181 grants a general user permission to use the image forming apparatus 1 without the need of approval by the administrator user. Thus, if a maintenance work that has no impact on a security level is performed, it allows the administrator user to save the trouble of approving the setting value, and the general user to be able to use the image forming apparatus 1 right away immediately after the maintenance work. In some cases, a device is replaced depending on what maintenance work is performed. If the memory part 15 is replaced, the setting values 150 are all lost and the image forming apparatus 1 operates by an initial value at an initial power ON after the device replacement. In this case, because the operation control user setting value 151 is also reset to an initial value, the image forming apparatus 1 operates at a level lower than a security level set by the administrator user.

Figure 7:
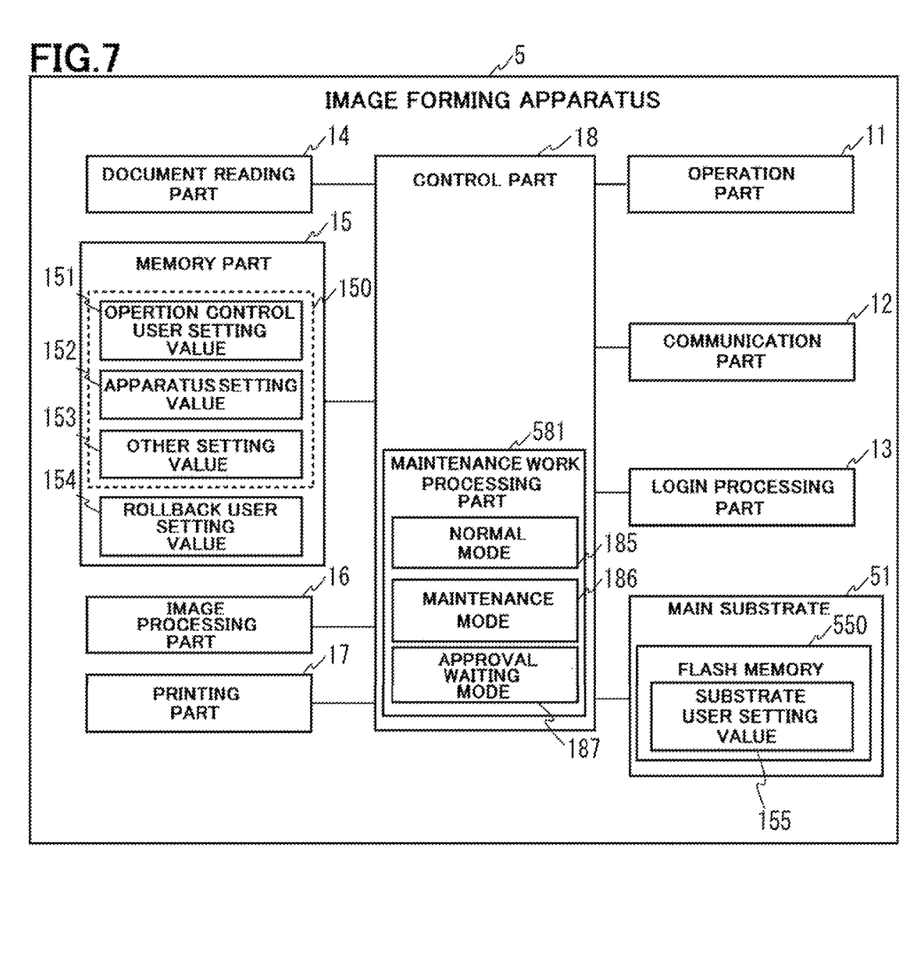
FIG. 7 is a functional block diagram showing a configuration of an image forming apparatus of another embodiment according to the present disclosure.

Alternatively, as shown in FIG. 7, it may be configured to back up the operation control user setting 151 in a flash memory 550 provided in a main substrate 51 of the image forming apparatus 5 as a substrate user setting value 155. This main substrate 51 is unremovable and is not replaced in a maintenance work. Further, if the removal of the flash memory 550 from the main substrate 51 is detected by a detection part (not shown), a protection is provided so as not to activate the image forming apparatus 5.

In this case, if a maintenance worker is logged in through the login processing part 13, the maintenance operation processing part 581 backs up the operation control user setting value 151 in the memory part 15 as the rollback user setting value 154, and backs up the operation control user setting value 151 in the flash memory 550 as the substrate user setting value 155. If a maintenance work to replace the memory part 15 is performed, it shows a state where the rollback user setting value 154 is not stored in the memory part 15 after replacement. Thus, when the maintenance work is finished, the maintenance operation processing part 581 determines whether or not there is the rollback user setting value 154 in the memory part 15. If there is no rollback user setting value 154 in the memory part 15, the maintenance operation processing part 581 determines that the memory part 15 is replaced, and copies the substrate user setting value 155 stored in the flash memory 550 to the memory part 15 as the rollback user setting value 154. Subsequently, the maintenance operation processing part 581 compares the copied rollback user setting value 154 with the operation control setting value 151, and determines whether or not a change is made in the operation control user setting value 151 by a maintenance work. If no change is made in the operation control user setting value 151, the maintenance operation processing part 581 sets the image forming apparatus 1 to the normal mode 185. If a change is made in the operation control user setting value 151, the maintenance operation processing part 581 sets the image forming apparatus 5 to the approval waiting mode 187, and encourages an administrator user to make sure the change. Then, if the change is rejected by the administrator user, the maintenance operation processing part 581 restores the operation control user setting value 151 to a state immediately before a maintenance work based on the rollback user setting value 154 restored by the substrate user setting value 155.

Since the substrate user setting value 155 can be used for the rollback user setting value 154, it allows the rollback user setting value 154 to be prevented from being lost if the memory part 15 is replaced. In this instance, the maintenance work processing part 581 may use the substrate user setting value 155 as the rollback user setting value 154 without providing the rollback user setting value 154 in the memory part 15, instead thereof.

Alternatively, power of the image forming apparatus 1 is turned OFF when removing the memory 15, and thus the operation control user setting value 151 may back up the operation control user setting value 151 in the flush memory 550 as the substrate user setting value 155. This prevents the rollback user setting value 154 from being lost due to run away with the memory part 15.

In the typical technology, there has been a problem so far that a user setting value is changed due to a maintenance work by a maintenance worker, and induces a lowered security level of the image forming apparatus before a user is aware of the change. Further, in the typical technology, if the image forming apparatus is configured such that a maintenance worker cannot freely change without permission a setting value of the image forming apparatus, there has been a problem that a maintenance work needs user's permission and due to this cannot perform an effective maintenance work.

According to the present disclosure, the disclosure enables preventing the image forming apparatus from being operated in a state where the user setting value is changed by a maintenance worker before a user is aware of the change.

The present disclosure is not necessarily limited to the above-mentioned embodiment, and it is needles to say that the present disclosure may be modified in many various ways within a range of not departing from the gist of the present disclosure.

What is claimed is:

1. An image forming apparatus that can operate in a normal mode in which operation is controlled based on a plurality of setting values, wherein
the plurality of setting values contains an operation control user setting value set by an administrator user having administrator authority and is stored in a memory part of the image forming apparatus;
the image forming apparatus comprises a control part comprising a maintenance work processing part that causes the image forming apparatus to operate based on a selected mode and transition between modes of operation, wherein the modes of operation include the normal mode, a maintenance mode, and an approval waiting mode;
the normal mode makes the image forming apparatus available to a general user;
the maintenance mode allows a worker to perform a maintenance work on the image forming apparatus, wherein the maintenance work can independently include changing the operation control user setting value and replacing the memory part;
the approval waiting mode:
causes the image forming apparatus to wait for an administrator user having administrator authority to approve or reject the change of the operation control user setting value; and
prevents a general user having no administrator authority from using the image forming apparatus until the approval or the rejection is received;
when a maintenance worker is logged into the image forming apparatus, the control part backs up and stores the operation control user setting value in the memory part when the image forming apparatus transitions to the maintenance mode, and then when the maintenance work is completed, the control part determines whether the operation control user setting value was changed during the maintenance work;
when the control part determines that the operation control user setting value was changed during the maintenance work, the image forming apparatus transitions to the approval waiting mode;
when an administrator user having administrator authority is logged into the image forming apparatus during the approval waiting mode, an approval screen displays the details of the change including the identity of the operation control user setting value before the change and the identity of operation control user setting value after the change, and displays a prompt to accept or reject the change;
when a general user is logged into the image forming apparatus during the approval waiting mode, a screen is displayed indicating that the image forming device is waiting for approval or rejection of the change from an administrator user having administrator authority;
when the control part determines that a setting value other than the operation control user setting value was changed during the maintenance work and the operation control user setting value was not changed during the maintenance work, the image forming apparatus transitions to the normal mode; and
when the maintenance work comprises replacing the memory part, the control part backs up and stores the operation control user setting value in a memory other than the memory part before the memory part is replaced and then, after the memory part is replaced, copies the operation control user setting value stored in said other memory to the memory part.

2. The image forming apparatus according to claim 1, wherein the maintenance work processing part backs up the operation control user setting value, immediately before the maintenance worker changes the memory part, as a rollback user setting value, and cancels the operation control user setting value changed by the maintenance worker and reflects the rollback user setting value in the plurality of setting values as the operation control user setting value if the administrator user rejects the change of the memory part.

3. The image forming apparatus according to claim 1, wherein if the administrator user approves the change of the operation control user setting value, the maintenance work processing part reflects the operation control user setting value changed by the maintenance worker in the plurality of setting values.

4. The image forming apparatus according to claim 2, wherein the maintenance work processing part backs up the operation control user setting value in a memory of an unremovable main substrate as a substrate user setting value, and if the memory part is replaced, applies the substrate user setting value to the rollback user setting value.

5. The image forming apparatus according to claim 4, wherein when power is turned OFF, the maintenance work processing part backs up the operation control user setting value in the memory part as the substrate user setting value.

6. The image forming apparatus according to claim 1, wherein:
the operation control user setting value stored in the memory part is stored in a first location of the memory part;
the step of copying the operation control user setting value stored in said other memory to the memory part comprises:
copying the operation control user setting value stored in said other memory to a second location of the memory part, wherein the second location is different than the first location;
after the operation control user setting value is copied from said other memory part to the second location of the memory part, the control part determines whether the operation control user setting value stored in the second location of the memory part is the same as the user setting value stored in the first location of the memory part,
when the control part determines the operation control user setting value stored in the second location of the memory part is the same as the user setting value stored in the first location of the memory part, the control part transitions the image forming apparatus to the normal mode; and when the control part determines the operation control user setting value stored in the second location of the memory part is different than the user setting value stored in the first location of the memory part, the control part transitions the image forming apparatus to the approval waiting mode.

\* \* \* \* \*